(12) United States Patent
Moore

(10) Patent No.: US 6,862,122 B1
(45) Date of Patent: Mar. 1, 2005

(54) HIGH SPEED SCANNING OR STEERING DEVICE

(76) Inventor: James Douglas Moore, 9552 Haines Canyon Ave., Tujunga, CA (US) 91042

( * ) Notice: Subject to any disclaimer, the term of this patent is extended or adjusted under 35 U.S.C. 154(b) by 9 days.

(21) Appl. No.: 10/633,435

(22) Filed: Aug. 4, 2003

(51) Int. Cl.$^7$ .............................................. G02B 26/08
(52) U.S. Cl. ........................ 359/198; 359/224; 248/476
(58) Field of Search ................................ 359/198–200, 359/212, 223, 224; 248/560, 476–479, 485–486, 573, 580, 583, 589, 605, 608, 609

(56) References Cited

U.S. PATENT DOCUMENTS

| | | | |
|---|---|---|---|
| 4,203,654 A | | 5/1980 | Ellis |
| 4,436,364 A | | 3/1984 | Laurer et al. |
| 4,708,420 A | | 11/1987 | Liddiard |
| 4,973,145 A | | 11/1990 | Kirkwood et al. |
| 5,004,205 A | * | 4/1991 | Brown et al. ............... 248/476 |
| 5,110,195 A | | 5/1992 | Loney |
| 5,550,669 A | | 8/1996 | Patel |

* cited by examiner

*Primary Examiner*—James Phan

(57) ABSTRACT

A high speed, high displacement steering device used for rapid mirror or light source pointing consisting of a pivoting central element and mounting stem, two orthogonally arranged and offset "V" shaped flexure elements connected to two orthogonally arranged moving elements which are driven by electromotive actuators. Said moving elements are connected to a base structure via parallel motion flexures which serve to prevent undesirable bending forces in the linear actuators, while at the same time preventing undesirable translation movements, cross coupling of motion and resonances. A third type of orthogonal rod flexure restrains the remaining axis of translation motion, namely a translation of the central pivoting element in a direction perpendicular to the tilting axes. Piezoelectric, electrostrictive or similar actuators operate either separately or simultaneously to drive the central element in the only two remaining unrestrained tilting axes, via the offset "V" shaped flexures, producing tilt in any commanded direction. A sealing cover containing an elastic diaphragm to accommodate tilt may be added to the outer support structure as required for protection in harsh environments.

11 Claims, 2 Drawing Sheets

HIGH SPEED SCANNING OR STEERING DEVICE

FIELD OF THE INVENTION

The present invention relates to devices for multiplying mechanical motion and, more particularly, to electromechanical devices which enable high speed leveraged tilting movements from short-travel linear actuator movements.

BACKGROUND OF THE INVENTION

Electromechanical motion multiplying devices, using stiff, compact, short-travel, low inertia actuators are used in a wide range of systems where high speed or high resolution mechanical movement is essential such as in laser beam targeting, telescope light beam tracking, vibration control, and scanning applications. These devices typically employ piezoelectric, electrostrictive, or electromagnetic actuators which act either directly or via leveraging means.

Certain optical systems require high speed low inertia, low hysteresis tilting devices for the precision 2-axis control of mirrors, optics or primary light beam sources. Some applications require both a large range of motion and high stiffness with minimal undesirable resonances. It will be seen that such existing or previously patented devices generally sacrifice stiffness for increased range of motion. Generally the inventor is forced to make some trade-off which might be undesirable for a range of applications. Ideally a device could be adaptable to satisfy a wide variety of applications and would be readily customized to increase tilting range while maintaining needed stiffness.

High speed scanning, pointing or steering devices should be capable of billions of cycles without developing any mechanical wear or "slop," would never require lubrication and would preferably employ flexural elements to drive and control the motion of the mechanism, in lieu of mechanical bearings. Such devices would preferably actuate without undesired cross coupling of motions and would be stiff in all axes of motion except those desired and commanded by the control system. Such devices may require high resonant stiffness when motionless to maintain a desired position in the presence of external vibrations in the environment, such as might be induced by gusting winds or adjacent vibrating machinery.

Manufacturing cost is an issue in certain high volume products. Laser communication devices manufactured in production lots will require a precise 2-axis beam steering mirror or laser source pointing device which could be readily and cheaply manufactured and would preferably contain few parts.

To maximize tilting range a device may require very thin flexural elements which are complex and difficult to manufacture by common methods due to bending of relatively long and thin elements from tool cutter forces. Electrical discharge machining (EDM) methods eliminate cutting tool forces, however large quantities cannot be economically machined using this method owing to the slow rate of material removal. Very thin flexural elements would ideally be produced by high speed stamping from pre-hardened, ultra-high strength sheet stock, thus eliminating machining and post-hardening operations of thin sections.

The present invention makes use of conventionally milled and machined integral flexures where relative movement is small. High strength flexures stamped from sheet stock would ideally be used to accommodate large tilting or bending motions in the device to maximize flexure life.

Existing low-cost scanning and steering devices achieve some of the desired characteristics described above. Economically priced, commercially available devices generally consist of three piezoelectric actuators operating directly on a mounting platform which is restrained radially by a surrounding housing and axially by a rod flexure or screw. These conventional devices exhibit fair stiffness but with limited range.

The designers of these lower cost devices tend to employ hysteresis-prone sliding fits in lieu of friction-free flexural guidance in order to reduce cost. In order to eliminate bending in fragile piezoelectric (PZT) actuators made of ceramic, designers of such lower cost devices employ a hardened ball to eliminate bending in the actuator which comprises a mechanical joint subject to wear, fretting, and hysteresis.

Various recently marketed "fast steering mirrors" driven by voice coil type linear actuators offer angular tilts exceeding 0.5 degrees. Newport Corporation (Irvine, Calif.) offers a custom made device, and advertises high range and flexural pivots. Voice coil actuators, however, are less compact than are electrostrictive or piezoelectric actuators and have no inherent stiffness. Therefore they must be stiffened through electrical damping means with a corresponding increase in complexity of controls and loss of electrical efficiency.

Liddiard in U.S. Pat. No. 4,708,420, discloses a device having high range and speed but not stiffness as an objective. Patel, in U.S. Pat. No. 5,550,669, discloses a complex device claiming stiffness and range of motion as apparent primary objectives, but not simplicity or ease of manufacture.

Laurer, in U.S. Pat. No. 4,436,634, invented a simple high displacement device in 1984 which consists of two oppositely oriented bimorph piezoceramic strips attached to a mirror. The Laurer device could benefit greatly from the addition of a rod flexure employed in the present device. Ellis, in U.S. Pat. No. 4,203,654 has a number of outboard rod flexures controlling piston motion, but these are connected to leaf type actuators so that the device must employ a centroidal pivot apparently to maintain resonant stiffness. U.S. Pat. No. 4,973,145 employs relatively long rod flexure supports arranged in a conical fashion, enabling considerable tilt and low hysteresis, but permitting low frequency tilting resonances due to lack of restraints to control the six possible axes of motion in a mechanical structure. Tilting resonances could be eliminated by electronic damping of the peripheral actuators, but the device seems unsuited to high speed operation.

From the foregoing discussion therefore, it is clear that prior art inventions and apparatus do not ideally meet the competing requirements of high stiffness, high range, low hysteresis, producibility, and specification adaptability. As noted hereinbelow, the range of the present inventive device may be increased by simply installing a thinner central spacer, or the resonant stiffness may be alternatively increased by installing a thicker spacer, where some loss of range is acceptable. Unlike the devices cited, the present device employing inherently stiff actuators relies on tensile, shear or compressive stiffness, as opposed to bending stiffness, to maximize operational bandwidth.

It is therefore an object of the invention to provide the most efficient balance of stiffness and range of motion for a number of steering, scanning and pointing applications.

It is another object of the invention to derive maximum benefit from compact, inherently stiff, precisely controllable, low inertia, high force actuators such as piezoelectric, magnetostrictive and electrostrictive actuators.

It is another object of the invention to facilitate high volume production of the inventive device by employing a relatively small number of easily manufactured elements.

It is another object of the invention to provide extended life and range of the device by employing certain flexural elements stamped from high performance alloy sheet stock.

It is another object of the invention to facilitate the use of the diecastable or freely machined materials in the manufacture of the base structure and certain integral, moderately stressed, linear motion flexures.

It is another object of the invention to provide a ready means of meeting different marketplace applications while maximizing commonality of elements.

SUMMARY OF THE INVENTION

In accordance with the present invention, there is provided a pivoting central element and mounting stem, two orthogonally arranged and offset "V" shaped flexure elements and two orthogonal moving elements connected to a base structure via parallel motion flexures which restrict motion to a single axis. The parallel motion flexures serve to prevent undesirable bending forces in the linear actuators which are sometimes made of fragile ceramic materials, while at the same time preventing undesirable translation movements or resonances. The central tilting element and mounting stem are restrained in two translation axes by the two "V" shaped and offset flexural elements connecting the central element to the respective axially driven elements. The offset distance between the planes of the "V" shaped elements determines the mechanical multiplication of the actuator movement. A third type of orthogonal rod flexure restrains the remaining axis of translation motion, namely a translation of the central pivoting element in a direction orthogonal to the "V" shaped flexural elements, referred to herein as bipod elements. Piezoelectric, electrostrictive or similar actuators operate either separately or simultaneously to drive the central element in the two remaining unrestrained tilting axes, via the offset bipod flexures, producing tilt in any commanded direction. A sealing cover containing an elastic diaphram to accommodate tilt may be added to the base structure as required for protection in harsh environments.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Figure 1:
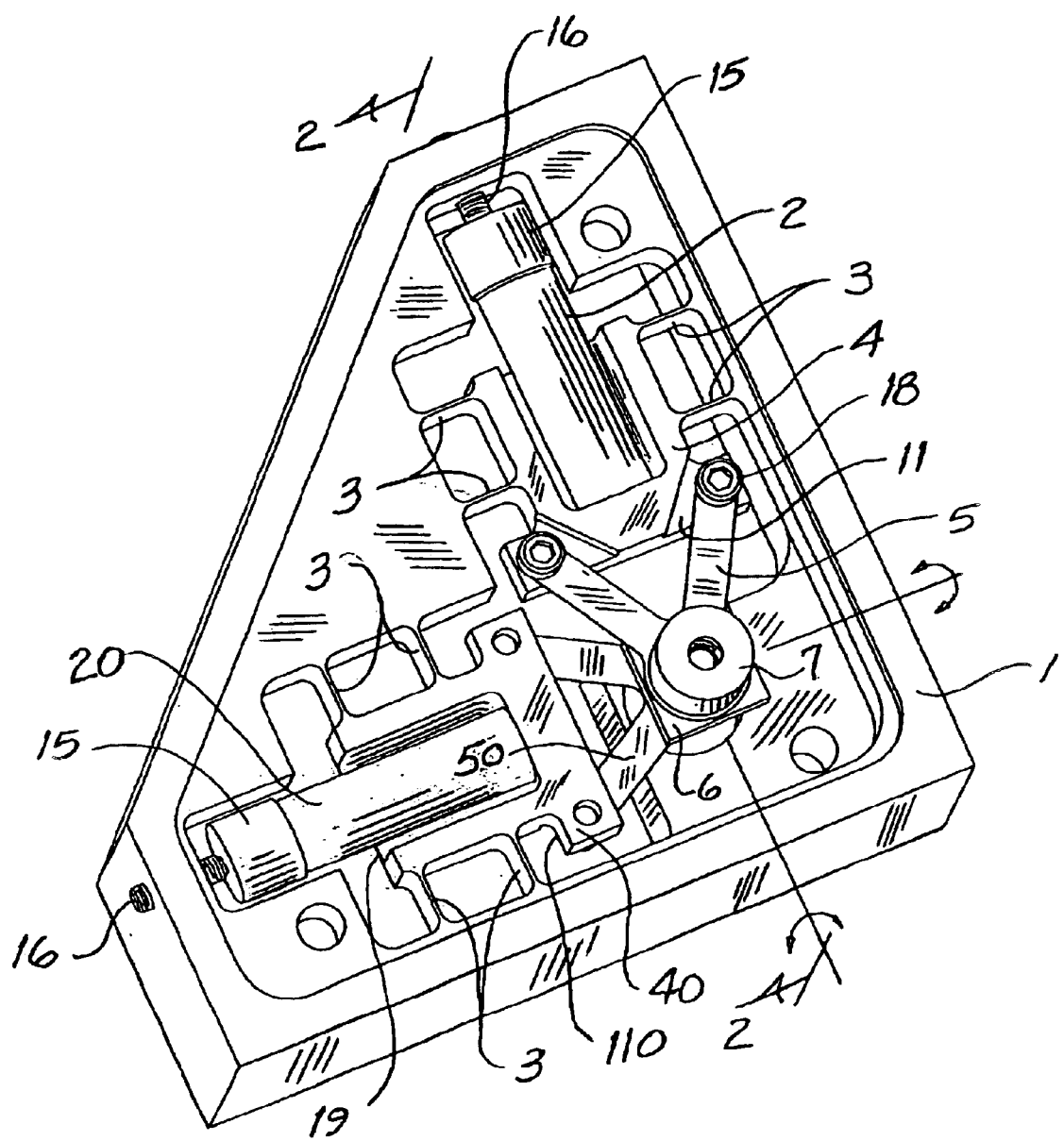
FIG. 1 is a perspective view of the assembled device with the cover removed.

FIG. 1 is a perspective view of the assembled inventive device with an optional cover removed.

Figure 2:
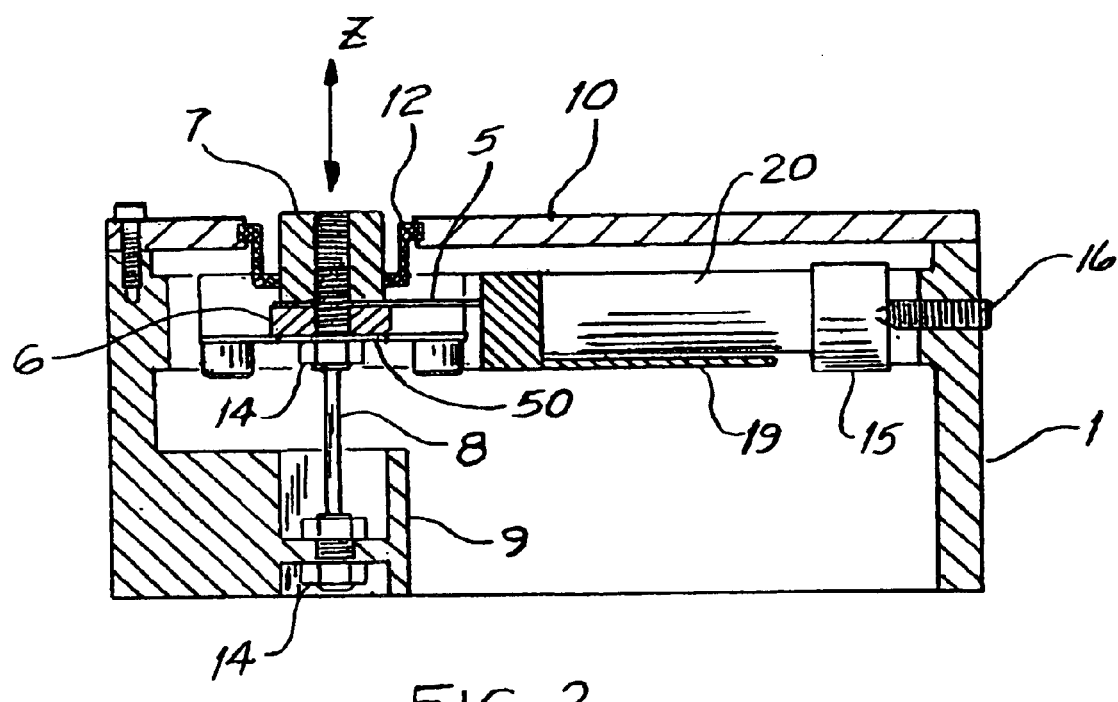
FIG. 2 is a cross sectional view of the device For purposes of clarity and brevity, like elements and components will bear the same designations and numbering throughout the FIGURES.

FIG. 2 is a cross sectional view of the device shown in FIG. 1, taken along lines 2—2 thereof.

As seen in FIG. 1, a first relatively wide pocketed translating frame element 4 and a second like frame element 40 are disposed orthogonally within a base structure 1. Each frame element 4 and 40 is restrained in five of six possible degrees of mechanical freedom by a set of parallel motion flexures 3. The parallel motion flexures 3 stiffly restrains the pocketed translating frame elements 4 and 40 in all possible degrees of freedom except one desired translation axis. Each of the translating frame elements 4 and 40 employ an integral shear stiffener 19 across the pockets in frame elements 4 and 40 to further reduce undesired flexibility and maximize resonant frequency. Each translating frame element 4 and 40 is acted upon by a first electromotive actuator 2 and a second like actuator 20, respectively. Each actuator 2 and 20 is preloaded against an adaptive spacer 15 cooperating with a preloading screw 16 in the base structure 1. Each set of parallel motion flexures 3 is impermanently deformed by the action of preloading screw 16 working cooperatively with adaptive spacer 15 to provide a desirable spring load on each electromotive actuator 2 and 20.

A central spacing element 6 disposed in the open cavity of the base structure 1 is securely clamped between the smaller ends of a first orthogonally disposed bipod flexure element 5 and a second like element 50. In severe applications, bonding or welding of interfaces between bipod flexure elements 5 and 50 and central spacing element 6 would be preferable.

Each pair of legs of bipod flexure elements 5 and 50 are likewise securely fastened to a respective pocketed translating frame element 4 and 40 by means of screws and peferably a film bonding adhesive, not shown. A first stepped interface 11 and a second stepped interface 110 are formed in respective pocketed translating frame elements 4 and 40. Interfaces 11 and 110 serve to reduce and control the eccentric distance between the legs of the bipod flexure elements 5 and 50 respectively. The thickness of the previously described central spacing element 6 controls the tilting leverage of the electromotive actuators 2 and 20 and would preferably match the distance between the stepped interfaces 11 and 110 to maintain equal interplanar separation of the bipod flexure elements 5 and 50, but may be slightly greater or less. The thickness of the central spacing element 6 could be readily altered to achieve a desired eccentricity and performance requirement.

As seen in FIG. 2, a rod flexure attachment boss 9 is integrally machined or otherwise formed into the base structure 1. One end of a rod flexure 8 is securely affixed by threaded or other secure means to rod flexure attachment boss 9. Rod flexure 8 is securely affixed on the opposite end to the central spacing element 6 by way of a threaded mounting stem 7 and a nut 14 which work to clamp ends of convergent bipod flexure elements 5 and 50 and the central spacing element 6 together. The interfaces of the mounting stem 7, bipod flexure elements and central spacer element would be preferably bonded to eliminate any possibility of slippage in severe applications. Rod flexure 8 serves as a single axis restrain stiffly preventing Z axis motion of the attached items while permitting flexure at any rotational angle.

FIG. 2 also shows an optional protective sealing cover 10 suitably attached with removable fasteners and employing an integral sealable elastic diaphragm 12 to permit tilting of the mounting stem 7.

The manner of operation of the described device is as follows:

Electromotive actuators 2 and 20, supplied with an electric current, expand a known distance which generally correlates to the value of the voltage driving the supplied current. A specific voltage applied to one actuator 2 or 20, induces a specific movement of the respective pocketed translating frame elements and the respective attached bipod flexure elements 5 and 50. This action tilts rather than translates the central spacing element 6 and attached mounting stem 7 because the second orthogonal and offset bipod flexure element 5 or 50 stiffly resists sidewise translations while readily allowing rotary tilt around an axis perpendicular to the actuator's axis of motion. Each of the two bipod flexure elements 5 and 50 effectively determines a virtual pivot for the other orthogonal system. When both actuators 2 and 20 recieve an electric current, the central spacing element 6 and mounting stem 7 are tilted at some compound angle generally dependent on and controlled by the voltage supplied to each actuator 2 and 20. When the voltage is lessened or removed, the translating frame elements 4 and 40 reverse direction of motion due to the previoiusly described preloading of the parallel motion flexures 5 and 50.

It should be pointed out that under certain conditions, allignment of the mounting stem 7 might be facilitated by manually adjusting the preloading screws with or without a voltage present. Depending on the type of actuator chosen, a specified electric current may be applied to each of the electromotive actuators 2 and 20 when adjusting a corresonding preloading screw 16 to meet certain desired position versus voltage relationships. It might be desirable for example to excite a piezoelectric actuators at half of their travel and rated voltage while adjusting the preloading screws until the axis of the mounting stem 7 is precisely perpendicular to a certain interface such as the bottom of the base structure 1.

It should also be noted that where the translation of the electromotive actuators 2 and 20 is relatively small, each set of parallel motion flexures 3 might be machined or diecast integral with the base structure 1 employing a readily machinable or diecast alloy having calculated minimal properties to ensure maintenance of preload force.

It will be appreciated by those skilled in the art that several variations can be made to the device herein disclosed without departing from the scope the present teaching. For example, a number of thin central spacing elements could be stacked together and bonded, while the distance between the stepped interfaces 11 and 110 and said ends of bipod element legs could likewise be shimmed, preferably with employing an adhesive to achieve virtually any desired spacing, while retaining commonality of other major components.

Another contemplated design example would have the set of parallel motion flexures 3 and pocketed translating frame elements 4 and 40 as a separate piece made of a high performance metal not integral with the base structure 1 which itself might be a castable alloy or even a reinforced plastic component. Such a variation would permit greater motion of the pocketed translating frame elements 4 and 40, especially if the parallel motion flexures were made longer and thinner. Voice coil actuators, not shown, could be employed in another variation by designing a larger, less compact device. Such an arrangement would necessarily employ relatively large translating frame element displacements and a greater interplanar offset between the bipod flexure elements to compensate for the lower force capabilities of voice coils.

In yet another variation, a third actuator could be adapted to and fixed to the rod flexure attachment boss 9 with the actuator's moving end attached to the rod flexure 8. Such an arrangement of the present device coupled with a third commonly used-actuator system would provide two rotation axes of motion as previously described and a third linear or "piston" motion along the axis of the rod flexure 8. This approach might be used for some focusing or precision distance control purpose.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A high speed scanning or steering device for pointing a mirror, optic or light source comprising:
    means for basing electromotive actuators, parallel motion flexures, and rod flexure attachment boss;
    means for restraining five of six possible axes of motion of a translating frame element, rigidly connected to said means for basing electromotive actuators, parallel motion flexures, and rod flexure attachment boss;
    means for attaching moving ends of parallel motion flexures and moving end of electromotive actuators;
    means for tilting of central spacing element while restricting sidewise translation motion of said element, securely connected to said means for attaching moving ends of parallel motion flexures and moving end of electromotive actuators;
    means for mounting stem attachment and convergent end of two bipod flexures, threadably clamped and preferably bonded to said means for tilting of central spacing element while restricting sidewise translation motion of said element;
    means for preventing translation of central element along z axis; and
    means for anchoring rod flexure to base structure, threadably coupled to said means for preventing translation of central element along z axis, lockably connected to said means for mounting stem attachment and convergent end of two bipod flexures, and rigidly connected to said means for basing electromotive actuators, parallel motion flexures, and rod flexure attachment boss.

2. The high speed scanning or steering device in accordance with claim 1, wherein said means for restraining five of six possible axes of motion of a translating frame element comprises a set of parallel motion flexures.

3. The high speed scanning or steering device in accordance with claim 1, wherein said means for attaching moving ends of parallel motion flexures and moving end of electromotive actuators comprises a pocketed translating frame element, having shear stiffener.

4. The high speed scanning or steering device in accordance with claim 1, wherein said means for tilting of central spacing element while restricting sidewise translation motion of said element comprises a bipod flexure element.

5. The high speed scanning or steering device in accordance with claim 1, wherein said means for mounting stem attachment and convergent end of two bipod flexures comprises a central spacing element.

6. The high speed scanning or steering device in accordance with claim 1, wherein said means for preventing translation of central element along z axis comprises a rod flexure.

7. A high speed scanning or steering device for pointing a mirror, optic or light source comprising:
- a base structure, for basing electromotive actuators, parallel motion flexures, and rod flexure attachment boss;
- a set of parallel motion flexures, for restraining five of six possible axes of motion of a translating frame element, rigidly connected to said base structure;
- a pocketed translating frame element, having shear stiffener, for attaching moving ends of parallel motion flexures and moving end of electromotive actuators;
- a bipod flexure element, for tilting of central spacing element while restricting sidewise translation motion of said element, securely connected to said pocketed translating frame element;
- a central spacing element, for mounting stem attachment and convergent end of two bipod flexures, threadably clamped and preferably bonded to said bipod flexure element;
- a rod flexure, for preventing translation of central element along z axis; and
- a rod flexure attachment boss, for anchoring rod flexure to base structure, threadably coupled to said rod flexure, lockably connected to said central spacing element, and rigidly connected to said base structure.

8. The high speed scanning or steering device as recited in claim 7, further comprising:
- a mounting stem, for attachment of mirror or light source, rigidly affixed to said central spacing element.

9. The high speed scanning or steering device as recited in claim 7, further comprising:
- a sealing cover, for protection from environment, safely connected to said base structure.

10. The high speed scanning or steering device as recited in claim 7, further comprising:
- an elastic diaphragm, for sealing a mounting stem, sealably connected to said sealing cover.

11. A high speed scanning or steering device for pointing a mirror, optic or light source comprising:
- a base structure, for basing electromotive actuators, parallel motion flexures, and rod flexure attachment boss;
- a set of parallel motion flexures, for restraining five of six possible axes of motion of a translating frame element, rigidly connected to said base structure;
- a pocketed translating frame element, having shear stiffener, for attaching moving ends of parallel motion flexures and moving end of electromotive actuators;
- a bipod flexure element, for tilting of central spacing element while restricting sidewise translation motion of said element, securely connected to said pocketed translating frame element;
- a central spacing element, for mounting stem attachment and convergent end of two bipod flexures, threadably clamped and preferably bonded to said bipod flexure element;
- a mounting stem, for attachment of mirror or light source, rigidly affixed to said central spacing element;
- a rod flexure, for preventing translation of central element along z axis;
- a rod flexure attachment boss, for anchoring rod flexure to base structure, threadably coupled to said rod flexure, lockably connected to said central spacing element, and rigidly connected to said base structure;
- a sealing cover, for protection from environment, safely connected to said base structure;
- an elastic diaphragm, for sealing a mounting stem, sealably connected to said sealing cover;
- an adaptive spacer, for insulating actuators from preloading screw torque; and
- a shear stiffener, for stiffening pocketed translating frame element.

\* \* \* \* \*